United States Patent [19]

Matsushima et al.

[11] Patent Number: 4,779,140

[45] Date of Patent: Oct. 18, 1988

[54] HARD COPY SYSTEM CONTROLLABLE BY CHANNEL DISCRIMINATION SIGNAL

[75] Inventors: Kenichi Matsushima; Fumihiro Tanaka; Kaneo Yamaguchi; Yoshio Shimada; Shinya Watanabe, all of Tokyo, Japan

[73] Assignee: Seiko Instruments & Electronics Ltd., Japan

[21] Appl. No.: 913,685

[22] Filed: Sep. 30, 1986

[30] Foreign Application Priority Data

Oct. 1, 1985 [JP] Japan ................................ 60-218231

[51] Int. Cl.⁴ .............................................. H04N 1/40
[52] U.S. Cl. ...................................... 358/258; 358/75; 358/80; 358/280; 358/257
[58] Field of Search ..................... 358/75, 80, 78, 257, 358/258, 280, 287

[56] References Cited

U.S. PATENT DOCUMENTS 4,034,400  7/1977  Owen et al. ........................... 358/75
4,228,466  10/1980  Vandling .............................. 358/257
4,558,369  12/1985  Shinohara et al. .................. 358/257

Primary Examiner—James J. Groody
Assistant Examiner—Robert M. Bauer
Attorney, Agent, or Firm—Bruce L. Adams; Van C. Wilks

[57] ABSTRACT

A hard copy system regulatively processes a video signal with a settable regulatory parameter to produce regulated picture information which is reproducible as a hard copy. A multiplexer receives a plurality of video signals having different signal forms to selectively apply one of the video signals to the hard copy system. A memory stores a plurality of different regulatory parameters assigned to the respective video signals and determined according to the different signal forms thereof so as to optimize the regulative processing thereof. A controller operates when a selected video signal is processed for retrieving from the memory a regulatory parameter assigned to the selected video signal to set the retrieved regulatory parameter to thereby enable the hard copy system to produce optimally regulated picture information.

10 Claims, 2 Drawing Sheets

HARD COPY SYSTEM CONTROLLABLE BY CHANNEL DISCRIMINATION SIGNAL

BACKGROUND OF THE INVENTION

Industrial field of utilization

This invention relates to a hard copy system for regulating the non-uniformity of video signals for each of a plurality of graphic terminals having RGB video signals so as to obtain correct hard copies, when picture signals from these terminals are switched by a multiplexer device wherefrom the copies are outputted.

In a hard copy system connected to a plurality of graphic terminals, this invention enables the connection with a multiplexer device requiring no regulation, by making the multiplexer device have channel discrimination signals and by providing a means which can control a take-in element of video signals based on the channel discrimination signals.

Prior Art

In taking-in of RGB video signals, these video signals supplied from the respective graphic terminals have differences in amplitude and phase generally even when these video signals are formed according to the same specification. When no regulation is applied to the amplitude and phase of these video signals, there occurs a data take-in error, which results in the incorrectness of hard copies. When a plurality of graphic terminals are connected with one hard copy system, accordingly, a plurality of regulation circuits would be needed for regulation according to the number of channels of the graphic terminals connected to the multiplexer device.

A drawback of the prior-art hard copy system is that the multiplexer device requires regulation circuits in a plurality of channels when it is connected to a plurality of graphic terminals, which necessitates a complicated circuit construction. A second drawback of the prior art system is that the multiplexer device can not be connected to graphic terminals of different kinds which are different in specifications such as a video frequency and a horizontal frequency.

SUMMARY OF THE INVENTION

Therefore, the present invention aims to furnish a hard copy system in which a multiplexer device can be connected to a plurality of graphic terminals including those of different kinds even when the device is constructed mainly of switching means using relays or the like.

In the case when video signals from a plurality of graphic terminals such as those of No. 1 to No. 4 are reproduced as hard copies, the system is comprised of a channel discrimination signal output circuit provided in the multiplexer device, a channel discrimination signal recognition circuit, a video signal take-in means controllable according to a regulation value and a specification value by CPU, and a nonvolatile RAM capable of storing and rewriting the regulation values and specification values assigned to a plurality of channels, which are provided in the hard copy system.

Specifications of video signals of each graphic terminal and regulation values enabling the optimum taking-in or processing of video signals are stored as regulatory parameters beforehand in the nonvolatile RAM of the hard copy system.

When a channel is selected in the multiplexer device, a video signal of a graphic terminal thus selected is inputted to the hard copy system, and simultaneously a channel discrimination signal is delivered from the multiplexer device. Based on the channel discrimination signal, the hard copy system reads the aforesaid parameters stored beforehand in the region of the selected channel in the nonvolatile RAM, and delivers the same to the video signal take-in element. According to the above-stated procedures, taking-in of the video signals is placed in an optimum state. Then a take-in operation or processing of the selected video signal is started, and according to the delivered parameters to thereby produce picture information which is stored in a picture storage circuit of the hard copy system.

DETAILED DESCRIPTION OF THE INVENTION

A preferred embodiment of the present invention will be described hereunder with reference the attached drawings.

Figure 1:
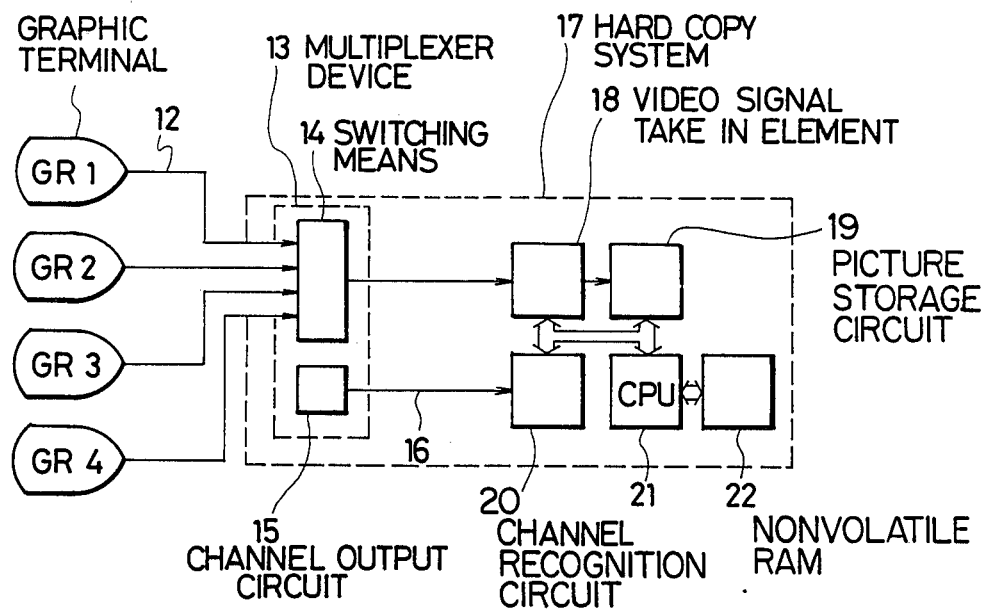
FIG. 1 is a block diagram of a construction of the present invention.

FIG. 1 is a block diagram in which four graphic terminals (GR 1 to GR 4) are connected to a hard copy system 17 through a multiplexer device 13. Video signals 12 are fed from the graphic terminals GR 1 to GR 4 to the multiplexer 13 respectively.

The multiplexer device 13 is comprised of a video signal switching means 14 and a channel discrimination signal output element 15. The video signal switching means 14 uses relays in the present embodiment and has four channels corresponding to the graphic terminals GR 1 to GR 4. When some channel is selected, the relay of the channel is made continuous, and video signals are delivered as they are to the hard copy system.

The hard copy system 17 is comprised of a video signal take-in element 18, a channel discrimination signal recognition circuit 20, a nonvolatile RAM 22 capable of storing specifications and regulation values of video signals of the four channels, a picture storage circuit (GM) 19 and a CPU 21. Each component can be controlled through the CPU 21.

The hard copy system 17 determines the channel of an inputted video signal by the channel discrimination signal recognition circuit 20. Then, parameters of the channel are read out of the nonvolatile RAM 22 and outputted to the video signal take-in element 18. Then, an operation of taking in video signals is started, and these signals are transmitted to the picture storage circuit 19.

Figure 2:
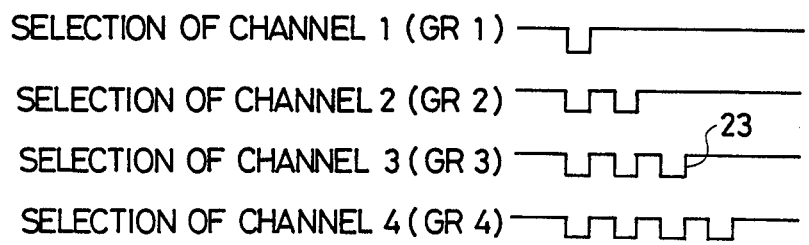
FIG. 2 is a time chart of channel discrimination signals.

Next, a time chart of channel discrimination signals prepared by the channel discrimination signal output circuit 15 is illustrated in FIG. 2. The channel discrimination signals are outputted, in the present embodiment, by the circuit 15 which generates pulses of the negative logic level corresponding to the terminals GR 1 to GR 4.

When the terminal GR 3 is selected, for instance, the pulse 23 of the negative logic level is generated three times. This circuit is constructed by a combination of bit switches with counters or other elements.

Figure 3:
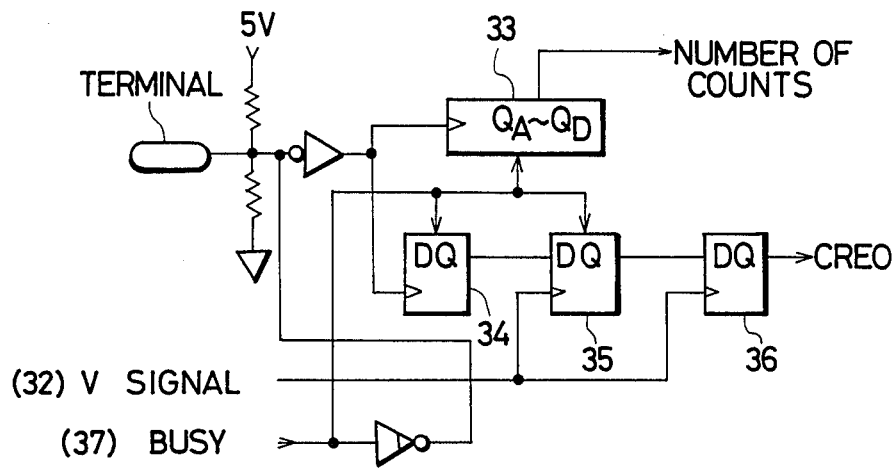
FIG. 3 is a diagram of a channel discrimination signal recognition circuit.

FIG. 3 is a detailed diagram of the channel discrimination signal recognition circuit 20 of a the color hard copy system, which is denoted by numeral 20 in FIG. 1. Numeral 34 denotes a flip-flop circuit detecting the trailing edge of the channel discrimination signal. Numerals 35 and 36 denote flip-flop circuits each of which latches the Q output of the flip-flop circuit 34 by a vertical synchronizing signal (V signal) 32. Numeral 33 denotes a counter which counts the number of pulses. A BUSY signal 37 is inputted as a clear signal to the counter 23, and the outputs (QA to QD) of the counter 23 are fed to an input port of the CPU 21.

Figure 4:
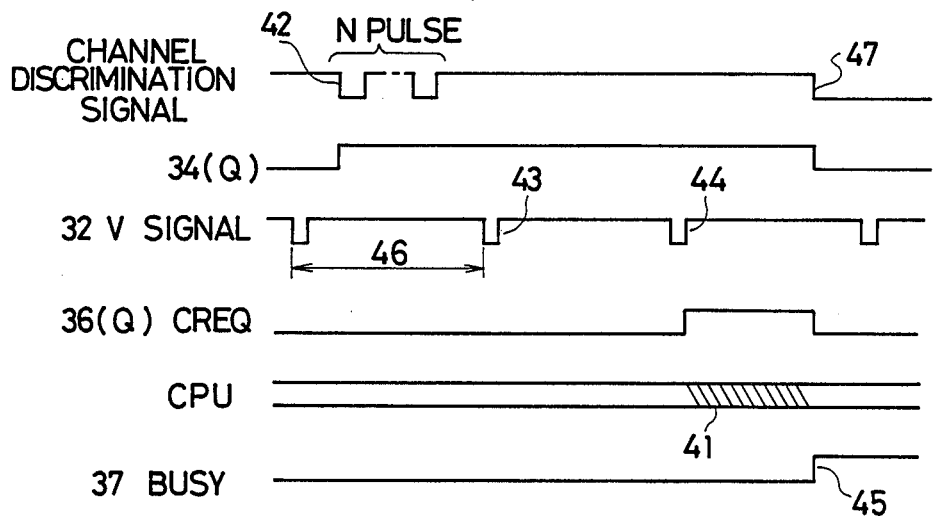
FIG. 4 is a time chart of operations in the channel discrimination signal recognition circuit.

FIG. 4 is a timing chart showing the sequence of the recognition of channels. When the channel discrimination signal turns active or holds low level 42 the output Q of the flip-flop circuit 34 turns high. Next, the output Q of the flip-flop circuit 35 turns high at the leading edge of the vertical synchronizing signal (V signal), and further the output Q of the flip-flop circuit 36 turns high at the leading edge 44 of a subsequent V signal. This signal is fed to the input port of CPU 21 and the CPU 21 recognizes, according to this signal, that a demand for copy is made from the outside. Next, CPU 21 reads out values of the outputs QA to QD of the counter 33 during a time indicated by a slanting line portion 41 so as to detect the channel which turns continuous in the multiplexer device 13. The outputs QA to QD of the counter 33 show indicate values which are counted up by the channel discriminations signal. The count values can be read exactly by a procedure of latching twice at the leading edge of the aforesaid V signal, only on condition that the pulses for discriminating the channel are ended within a time interval 46 of one vertical period.

After the completion of the above-stated operation, the CPU 21 reads out parameters from the region of selected channel in the nonvolatile RAM 22 and delivers the same to the video signal take-in element 18. Moreover, the CPU 21 makes the BUSY signal high level 45 for the counter 33 and the flip-flops 34, 35 and 36. Thereby the channel discrimination signal turns the low level 47, informing the multiplexer device 13 that the hard copy system is in the course of taking in video signals and printing. For the channel discrimination signals, a conventional signal line for copy start and BUSY signals is used as it is, and this line effects copy start and BUSY functions as well in the present system.

According to the present invention, the multiplexer device requiring no regulation circuits and thus having a simple construction can be employed when hard copies are outputted from a plurality of graphic terminals, which enables the sharp reduction of cost. In addition to the employment for video signals of the same specification, the present invention enables the connection of graphic terminals of different kinds with the same hard copy system.

Moreover, the present invention can be applied not only to the hard copy system, but also to all kinds of systems in which video signals are stored graphically.

What is claimed is:

1. In a hard copy system in which hard copies are outputted in response to video signals transmitted through a plurality of graphic terminals, the hard copy system comprising:

a multiplexer device which selectively receives video signals through a plurality of channels thereof and which includes outputting means for outputting a channel discrimination signal effective to discriminate a channel through which the selected video signal is received;

a channel recognition circuit which determines a channel according to the channel discrimination signal;

memory means in which regulation values employed in processing of video signals are stored for the plurality of channels;

controlling means which reads the regulation value of the channel determined by the channel recognition circuit from the memory means;

a video signal take-in element controlled by the controlling means for processing the selected video signal according to the read regulation value to produce picture information; and a picture storing circuit which stores the picture information.

2. A graphic processing apparatus comprising: processing means for regulatively processing a video signal with a settable regulatory parameter to produce regulated picture information; receiving means for receiving a plurality of video signals having different signal forms to selectively apply one of the video signals to the processing means; memory means for storing a plurality of different regulatory parameters assigned to the respective video signals and determined according to the different signal forms thereof so as to optimize the regulative processing thereof; and control means operative when a selected video signal is processed for retrieving from the memory means a regulatory parameter assigned to the selected video signal to set the retrieved regulatory parameter into the processing means to thereby enable the processing means to produce optimally regulated picture information.

3. A graphic processing apparatus according to claim 2; wherein the processing means includes a take-in element for taking in a selected video signal.

4. A graphic processing apparatus according to claim 2; wherein the receiving means comprises a multiplexer device for multiplexing a plurality of video signals fed from a plurality of external graphic terminals to select the video signals.

5. A graphic processing apparatus according to claim 4; wherein the multiplexer device has a plurality of channels assigned to the respective video signals and selected to receive a given video signal, and includes discriminating means for discriminating the selected channel.

6. A graphic processing apparatus according to claim 5; wherein the memory means has a plurality of memory regions assigned to the respective channels for storing therein the respective regulatory parameters.

7. A graphic processing apparatus according to claim 6; wherein the control means includes means for addressing the memory regions according to the discriminated channel to thereby retrieve a regulatory parameter.

8. A graphic processing apparatus according to claim 2; wherein the receiving means includes means for receiving a plurality of video signals having different amplitudes and phases.

9. A graphic processing apparatus according to claim 8; wherein the memory means includes means for storing a plurality of different regulatory parameters determined according to the different amplitudes and phases of the video signals.

10. A graphic processing apparatus according to claim 2; including additional memory means for storing the optimally regulated picture information reproducible as a hard copy.

* * * * *